US012603570B2

(12) United States Patent
Wolf et al.

(10) Patent No.: US 12,603,570 B2
(45) Date of Patent: Apr. 14, 2026

(54) REDUCED-RIPPLE CHARGE PUMP SYSTEMS AND METHODS

(71) Applicant: Apple Inc., Cupertino, CA (US)

(72) Inventors: Benedikt Wolf, Neu-Ulm (DE); Alessandro Perrotta, Kirchheim unter Teck (DE); Robert Prinz, Stuttgart (DE); Frank M Kronmüller, Kirchheim unter Teck (DE); Jan Grabinski, Kirchheim unter Teck (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/598,695

(22) Filed: Mar. 7, 2024

(65) Prior Publication Data

US 2025/0286450 A1      Sep. 11, 2025

(51) Int. Cl.
*H02M 3/07* (2006.01)
*H02M 1/14* (2006.01)
(52) U.S. Cl.
CPC .............. *H02M 3/07* (2013.01); *H02M 1/14* (2013.01)
(58) Field of Classification Search
CPC ............ H02M 3/02; H02M 3/04; H02M 3/06; H02M 3/07; H02M 3/071; H02M 3/072; H02M 3/073; H02M 3/075; H02M 3/076; H02M 3/077; H02M 3/078; H02M 1/0045; H02M 7/4837; H02M 7/483
See application file for complete search history.

(56) References Cited

U.S. PATENT DOCUMENTS

| | | | |
|---|---|---|---|
| 6,208,196 B1 | 3/2001 | St. Pierre | |
| 6,859,091 B1 * | 2/2005 | Nicholson | H02M 3/07 |
| | | | 327/536 |
| 7,990,742 B2 | 8/2011 | Lesso | |
| 8,890,604 B2 | 11/2014 | Lesso et al. | |
| 9,225,238 B2 | 12/2015 | Chevalier | |
| 9,515,559 B2 | 12/2016 | Chevalier | |
| 10,148,171 B2 | 12/2018 | Nguyen et al. | |

FOREIGN PATENT DOCUMENTS

| | | |
|---|---|---|
| CN | 102594133 B | 7/2012 |
| CN | 103219883 B | 7/2013 |
| CN | 203590027 U | 5/2014 |
| CN | 104410271 B | 3/2015 |

OTHER PUBLICATIONS

"TPS6024x 170-µVrms Zero-Ripple Switched Capacitor Buck-Boost Converter for VCO Supply," Texas Instruments, SLVS372C, Jun. 2001—rev. Oct. 2015, 22 pgs.

* cited by examiner

*Primary Examiner* — Diana J. Cheng
(74) *Attorney, Agent, or Firm* — Fletcher Yoder, P.C.

(57) ABSTRACT

An electrical device may include an electrical load that draws current, a charge pump that provides the current to the electrical load, and clock circuitry. The charge pump may include an amplifier, a first fly capacitor, a second fly capacitor, and multiple switches. A first set of the switches may couple the first fly capacitor between a supply and ground based on a first set of clock signals and between the amplifier and the electrical load based on a second set of clock signals. A second set of the switches may couple the second fly capacitor between the supply and ground based on the second set of clock signals and between the amplifier and the electrical load based on the first set of clock signals. The clock circuitry may alternate between generating the first set of clock signals and the second set of clock signals based on the current.

20 Claims, 7 Drawing Sheets

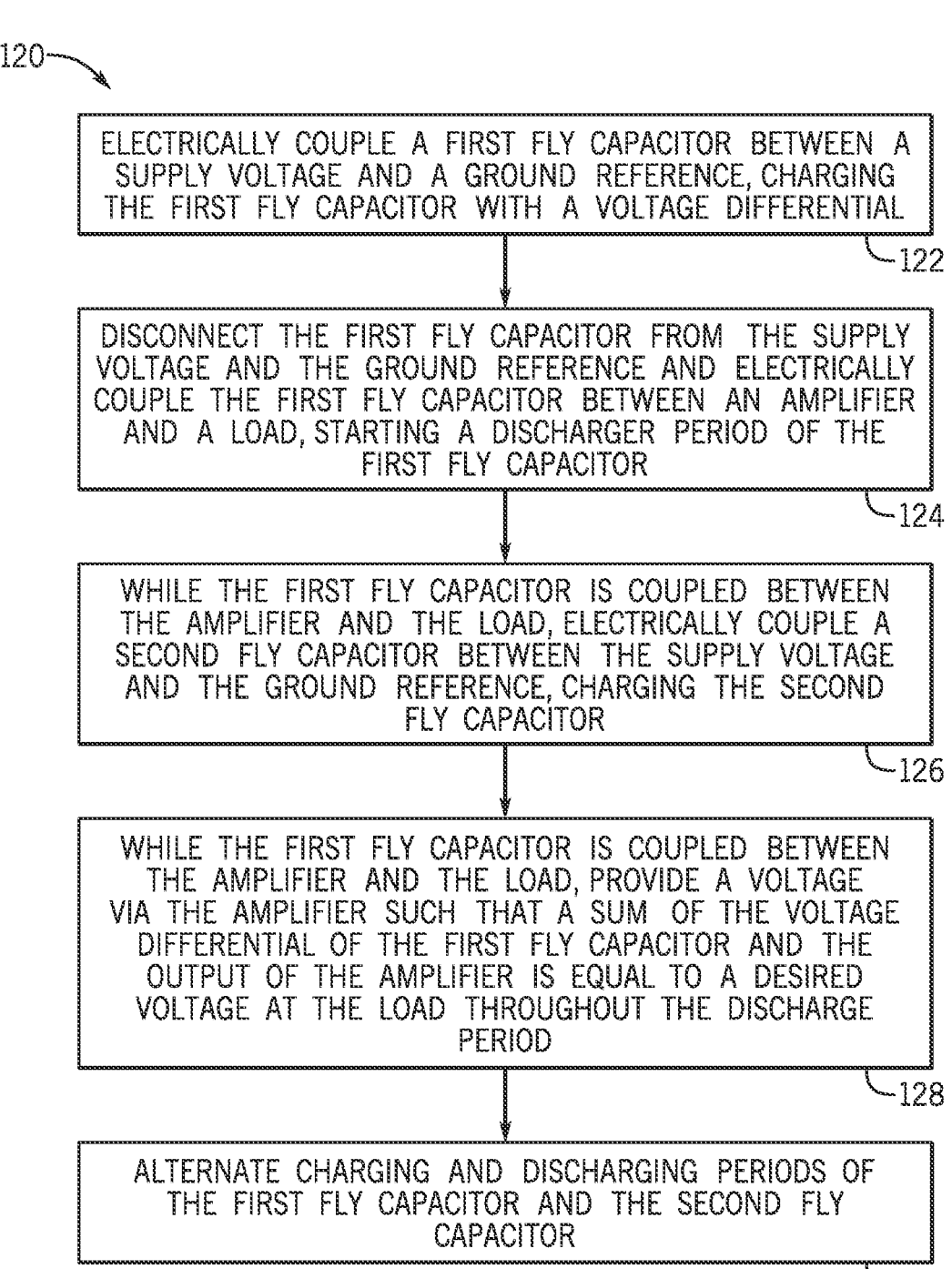

120

ELECTRICALLY COUPLE A FIRST FLY CAPACITOR BETWEEN A SUPPLY VOLTAGE AND A GROUND REFERENCE, CHARGING THE FIRST FLY CAPACITOR WITH A VOLTAGE DIFFERENTIAL

122

DISCONNECT THE FIRST FLY CAPACITOR FROM THE SUPPLY VOLTAGE AND THE GROUND REFERENCE AND ELECTRICALLY COUPLE THE FIRST FLY CAPACITOR BETWEEN AN AMPLIFIER AND A LOAD, STARTING A DISCHARGER PERIOD OF THE FIRST FLY CAPACITOR

124

WHILE THE FIRST FLY CAPACITOR IS COUPLED BETWEEN THE AMPLIFIER AND THE LOAD, ELECTRICALLY COUPLE A SECOND FLY CAPACITOR BETWEEN THE SUPPLY VOLTAGE AND THE GROUND REFERENCE, CHARGING THE SECOND FLY CAPACITOR

126

WHILE THE FIRST FLY CAPACITOR IS COUPLED BETWEEN THE AMPLIFIER AND THE LOAD, PROVIDE A VOLTAGE VIA THE AMPLIFIER SUCH THAT A SUM OF THE VOLTAGE DIFFERENTIAL OF THE FIRST FLY CAPACITOR AND THE OUTPUT OF THE AMPLIFIER IS EQUAL TO A DESIRED VOLTAGE AT THE LOAD THROUGHOUT THE DISCHARGE PERIOD

128

ALTERNATE CHARGING AND DISCHARGING PERIODS OF THE FIRST FLY CAPACITOR AND THE SECOND FLY CAPACITOR

REDUCED-RIPPLE CHARGE PUMP SYSTEMS AND METHODS

BACKGROUND

This disclosure relates to systems and methods of power management circuitry for semiconductor devices and, more particularly, to charge pumps for increasing voltage potential.

Integrated circuits are found in a vast array of electronics devices, including computers, handheld devices, wearable devices, vehicles, robotics, and more. An electronic device may be operated in various operational modes, such as a normal mode, a powered-off mode, and a reduced-power mode, among others. In some systems, circuit blocks designed to perform various functions may be designed to operate at different power supply levels (e.g., voltage levels). Power management circuitry may vary power supply levels delivered to the different circuit blocks.

Power management circuits sometimes include one or more power converter circuits that generate regulated voltage levels based on an input power supply signal. Such regulator circuits may employ different operations to regulate a respective voltage level. For example, a power management circuit may include a charge pump for providing an increased direct current (DC) voltage output. However, operation of these power circuits, such as a typical charge pump, could result in noise (e.g., switching harmonics, voltage deviations such as ripples) being introduced into the generated supply signals. Noise in the supply signals may be difficult to filter out and/or may undesirably reduce the accuracy of downstream system operations based on the signals generated.

SUMMARY

Integrated circuit systems may include multiple circuits to perform specific operations. The circuits may be fabricated on one or more substrates and may use different power (e.g., voltage) levels. Power Management Units (PMUs) may include multiple power converter circuits that generate regulated voltage levels for various power signals delivered to one or more loads. In some embodiments, such power converter circuits may be designed to generate voltage levels greater than (e.g., relative to a ground reference) that of an input reference voltage or less than a ground reference (e.g., negative voltage). For example, a charge pump may receive a supply voltage and provide an output voltage at a greater potential difference from the ground reference than the reference voltage.

However, typical charge pump circuits may generate ripples or other deviations in the output voltage and/or utilize large output capacitors to help mitigate the generated ripples. In overcoming the deficiencies of typical charge pump circuits, a reduced-ripple charge pump may provide an increased voltage level (e.g., relative to the input supply voltage) for a desired load without or with minimal ripple effects, with reduced output capacitor size, and/or reduced switching frequency. Thus, the reduced-ripple charge pump may provide for increased power efficiency, decreased footprint, and a cleaner (e.g., with less voltage variation) voltage output than a typical charge pump circuit.

In some embodiments, the reduced-ripple charge pump may include a current source (e.g., operational transconductance amplifier (OTA)) and two or more stages that alternate between phases according to a clock signal. Additionally, each stage may include at least one fly capacitor, switches (e.g., transistors) that operatively connect and disconnect the different leads of a fly capacitor to charge or discharge according to the phase.

As the clock signal switches the phases of the stages, the fly capacitor(s) of the first stage and the second stage alternate between being charged (e.g., between the ground voltage and the supply voltage) in the first phase and discharged (e.g., between the output node and the amplifier) in the second phase. During the second phase, the voltage differential (applied to the fly capacitor in the first phase) is added to the voltage output of an OTA to achieve the output voltage of the output node. However, the fly capacitor may not discharge immediately or entirely. Instead, current may be supplied from the OTA to match the current usage on the output node (e.g., by a load of the reduced-ripple charge pump), and as the fly capacitor is discharged (e.g., reducing its stored voltage differential), the OTA may increase its voltage level output to maintain the output voltage of the output node. When the amplifier reaches its maximum voltage output (e.g., for the given supply voltage) or within a buffer of the maximum voltage output, the stages may alternate such that the second stage feeds the output node while the first stage charges.

The rate of discharge of the fly capacitors may depend on the current draw of the load. As such, in some embodiments, the clock signal may have a preset frequency or be adjustable, such as via a clock controller, based on the current draw of the load. The clock controller may estimate, measure, or otherwise assume (e.g., based on an operating mode of the electronic device, the load) a current draw of the load and adjust the clock frequency based thereon. Additionally or alternatively, the clock controller may include a comparator to monitor the voltage differential of the fly capacitors. As such, switching between phases may be triggered based on how quickly the fly capacitor discharges. In other words, the reduced-ripple charge pump may self-regulate the switching frequency, which may increase efficiency. As such, an electronic device may include a reduced-ripple charge pump, such as in a PMU, for providing an increased (e.g., relative to the supply voltage) output voltage without or with reduced voltage deviations (e.g., ripples, ringing), while having a reduced footprint and/or increased power efficiency, as compared to a conventional charge pump circuit.

BRIEF DESCRIPTION OF THE DRAWINGS

Various aspects of this disclosure may be better understood upon reading the following detailed description and upon reference to the drawings described below.

FIG. 12 is a flowchart of an example process for operating the reduced-ripple charge pump of FIG. 6 or the reduced-ripple negative charge pump of FIG. 8, in accordance with an embodiment.

DETAILED DESCRIPTION

Figure 1:
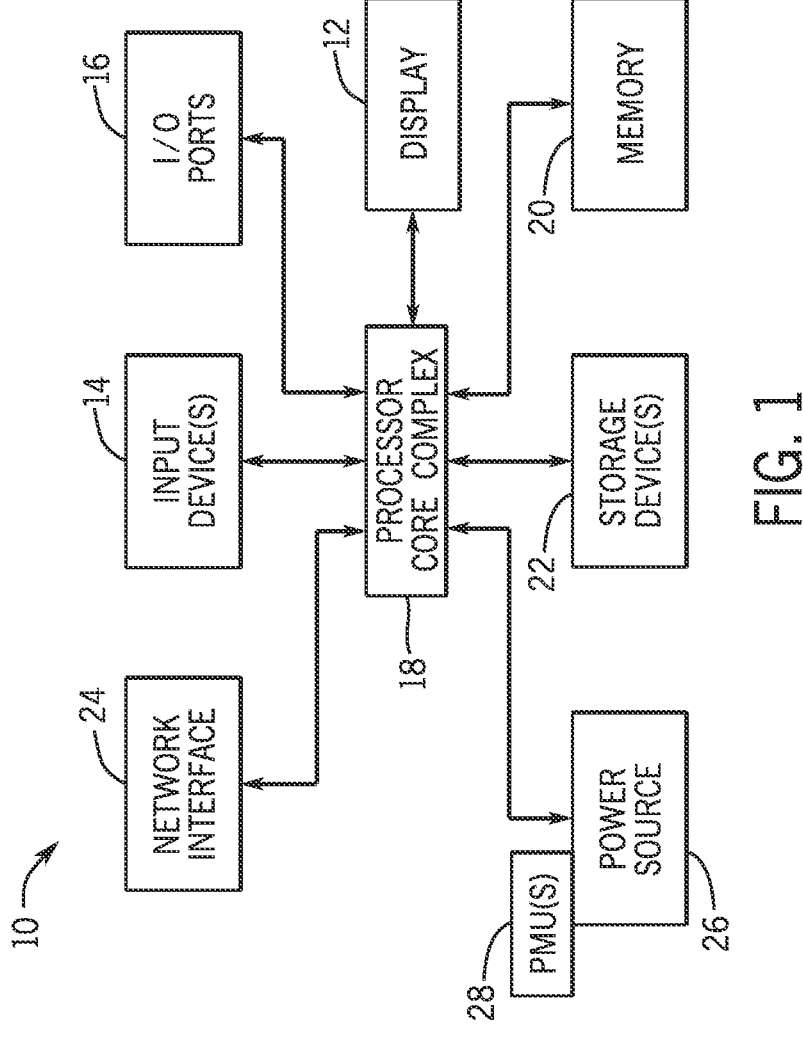
FIG. 1 is a schematic block diagram of an electronic device including a power management unit (PMU), in accordance with an embodiment.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices such as computer systems may include multiple circuits to perform specific operations. The circuits may be fabricated on one or more substrates and may be designed for use at different voltage levels. In general, an electronic may receive power at one or more supply voltages, such as from a battery, power adapter connected to a wall outlet or car battery, etc. Power Management Units (PMUs) may include multiple power converter circuits that generate regulated voltage levels for various power supply signals delivered to one or more loads. In some scenarios, it may be desired that a power converter circuit generate a voltage level greater than (e.g., relative to a ground reference voltage) that of an input supply voltage or less than a ground voltage (e.g., negative voltage).

As such, in some embodiments, a charge pump may be utilized to receive a supply voltage and provide an output voltage greater than the supply voltage. However, typical charge pump circuits may generate ripples (e.g., ringing) in the output voltage due to the switch-pulsed discharge of fly capacitors. Such ripples or other signal distortions may be exacerbated at higher current draws of the load. For example, the maximum load of a typical charge pump may be proportional to the size of the ripple effect, the switching frequency of the charge pump, and the size of the output capacitor. However, increasing the switching frequency may increase power consumption and/or introduce additional avenues for error. Moreover, increasing the size of the output capacitor may take up valuable space within a PMU and/or the electronic device as well as increase the costs associated with manufacturing the charge pump. To help overcome such deficiencies in typical charge pump circuits, a reduced-ripple charge pump may provide an increased voltage level (e.g., relative to the input supply voltage) for a desired load without or with minimal increase in switching frequency and/or output capacitor size. Thus, the reduced-ripple charge pump may provide for increased power efficiency, decreased footprint, and a cleaner (e.g., with less voltage variation) voltage output than a typical charge pump circuit.

In some embodiments, the reduced-ripple charge pump may include a current source (e.g., amplifier) and two or more stages, each having at least one fly capacitor, that alternate between phases according to a clock signal. Additionally, each stage may include switches (e.g., transistors) that operatively connect and disconnect the leads of a fly capacitor according to the phase. For example, the first and second leads of the fly capacitor of a first stage may be electrically coupled to a ground voltage and a supply voltage, respectively, during a first phase. Moreover, the first and second leads of the fly capacitor of the first stage may be electrically coupled to an amplifier, such as an operational transconductance amplifier (OTA), and an output node of the reduced-ripple charge pump, respectively, during a second phase. As should be appreciated, while discussed herein as utilizing an OTA, the reduced-ripple charge pump may utilize any suitable amplifier or other current source for supplying current over a range of voltages.

As the clock switches between phases, the fly capacitor of the first and second stages alternate between being charged (e.g., between the ground voltage and the supply voltage) in the first phase and discharged (e.g., between the output node and the amplifier) in the second phase. During the second phase, the voltage differential applied to the fly capacitor in the first phase) is added to the voltage output of the amplifier to achieve the output voltage of the output node. However, the fly capacitor may not discharge immediately or entirely. Instead, current may be supplied from the amplifier to match the current usage on the output node (e.g., by a load of the reduced-ripple charge pump). As the fly capacitor is discharged (e.g., reducing its stored voltage differential), the amplifier may increase its voltage level output to maintain the output voltage of the output node. When the amplifier reaches its maximum voltage output (e.g., for the given supply voltage) or within a buffer of the maximum voltage output, the stages may alternate such that the second stage feeds the output node while the first stage charges. As should be appreciated, the buffer may be based on the maximum voltage output (e.g., the supply voltage) of the amplifier, a timing of the clock signal, a current draw of the load, the voltage of the output node, or a combination thereof.

As the amplifier provides a matched current draw of the output node to the fly capacitor in the second phase, the discharge time of the fly capacitor may vary based on the size of the fly capacitor and the current draw of the load on the output node. In other words, at lower current draws, the fly capacitors may discharge slower in the second phase than at higher current draws. As such, in some embodiments, the frequency of the clock signal may be adjusted to maintain the output voltage based on the current draw of the load. For example, at a lower current draw, there may be additional time before the combined output of the decreasing voltage differential of the fly capacitor and the increasing (e.g., until the supply voltage or a buffer amount therefrom is reached)

output voltage of the amplifier can no longer sustain the output voltage. As such, the length of time between phase switches may be decreased at lower current draws.

In some embodiments, the clock signal may have a preset frequency or be controllable, such as via a clock controller. The clock controller may estimate, measure, or otherwise assume (e.g., based on an operating mode of the electronic device, the load) a current draw of the load and adjust the clock frequency based thereon. Additionally or alternatively, the clock controller may include a comparator to monitor the voltage differential of the fly capacitors. As such, switching between phases may be triggered based on how quickly the fly capacitor discharges. Moreover, in some embodiments, the clock controller may be integral with the reduced-ripple charge pump such that the reduced-ripple charge pump is considered to self-clock based on the current draw of the load. As such, an electronic device may include a reduced-ripple charge pump, such as in a PMU, for providing an increased (e.g., relative to the supply voltage) output voltage without or with reduced voltage deviations (e.g., ripples, ringing), reduced footprint, and/or increased power efficiency, as compared to a conventional charge pump circuit.

With the foregoing in mind, FIG. 1 is a block diagram of an example electronic device 10 that may utilize the techniques of the present disclosure. In some embodiments, the electronic device 10 may include an electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and a power management unit (PMU) 28. As should be appreciated, the electronic device 10 may be any suitable electronic device, such as a computer, a mobile phone, a portable media device, a tablet, a television, a virtual-reality headset, a wearable device such as a watch, a vehicle and/or vehicle dashboard, or the like. Indeed, FIG. 1 is intended to represent one example of a particular implementation and is intended to illustrate the types of components that may be present in the electronic device 10. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. One or more PMU(s) 28 may help distribute power to various circuitries of the electronic device 10. As should be appreciated, features described herein as relating to a PMU 28 may apply to multiple PMUs 28. Moreover, some descriptions included herein may apply to systems with one PMU 28 and/or to systems with multiple PMUs 28. Furthermore, PMUs 28 may include different components relative to each other, for example some PMUs 28 may include regulators while other PMUs 28 may not include regulators, as is described further herein. Additionally, in some embodiments, a PMUs 28 may be integrated with and/or be coupled to one or more chip packages (e.g., as one or more loads).

The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch-sensing components may receive user inputs by detecting occurrence or position of an object touching the surface of the electronic display 12.

Figure 2:
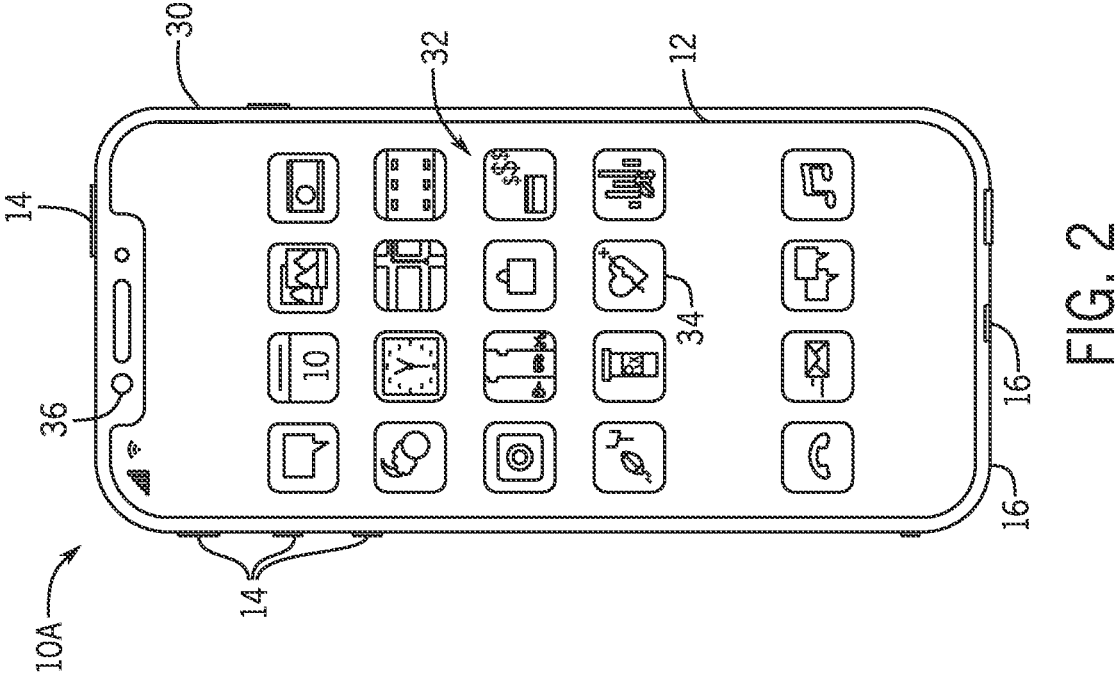
FIG. 2 is a front view of a mobile phone representing an example of the electronic device of FIG. 1, in accordance with an embodiment.

The electronic device 10 may take any suitable form. One example of the electronic device 10 in the form of a handheld device 10A is shown in FIG. 2. The handheld device 10A may be a portable phone, a media player, a personal data organizer, a handheld game platform, or the like. For illustrative purposes, the handheld device 10A may be a smartphone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
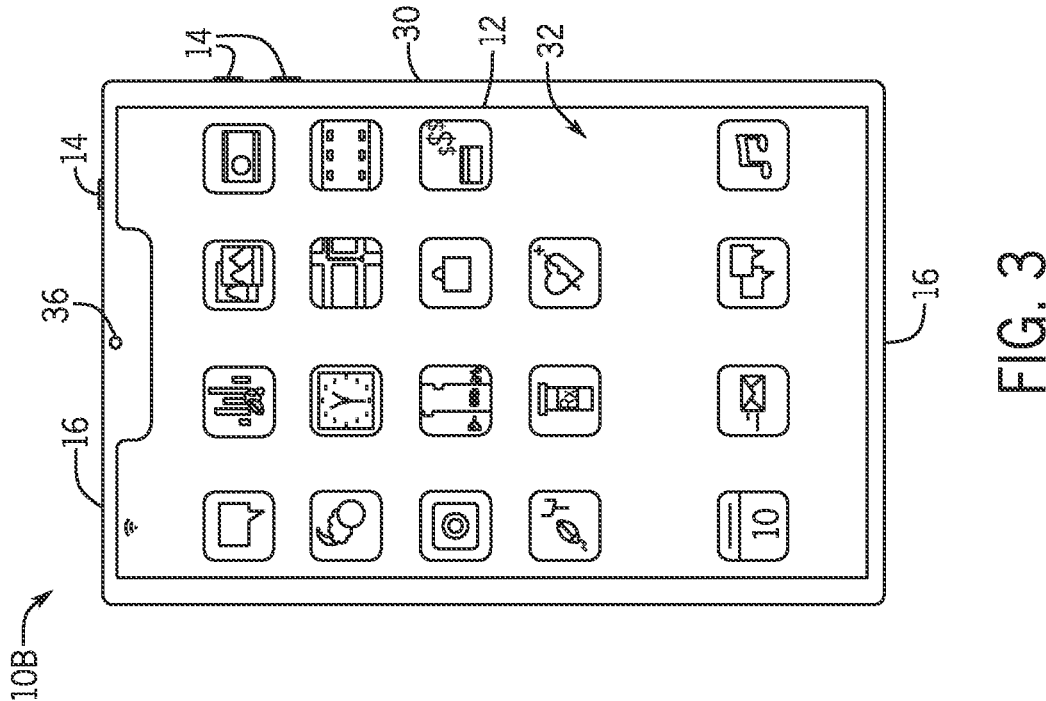
FIG. 3 is a front view of a tablet device representing an example of the electronic device of FIG. 1, in accordance with an embodiment.
Figure 4:
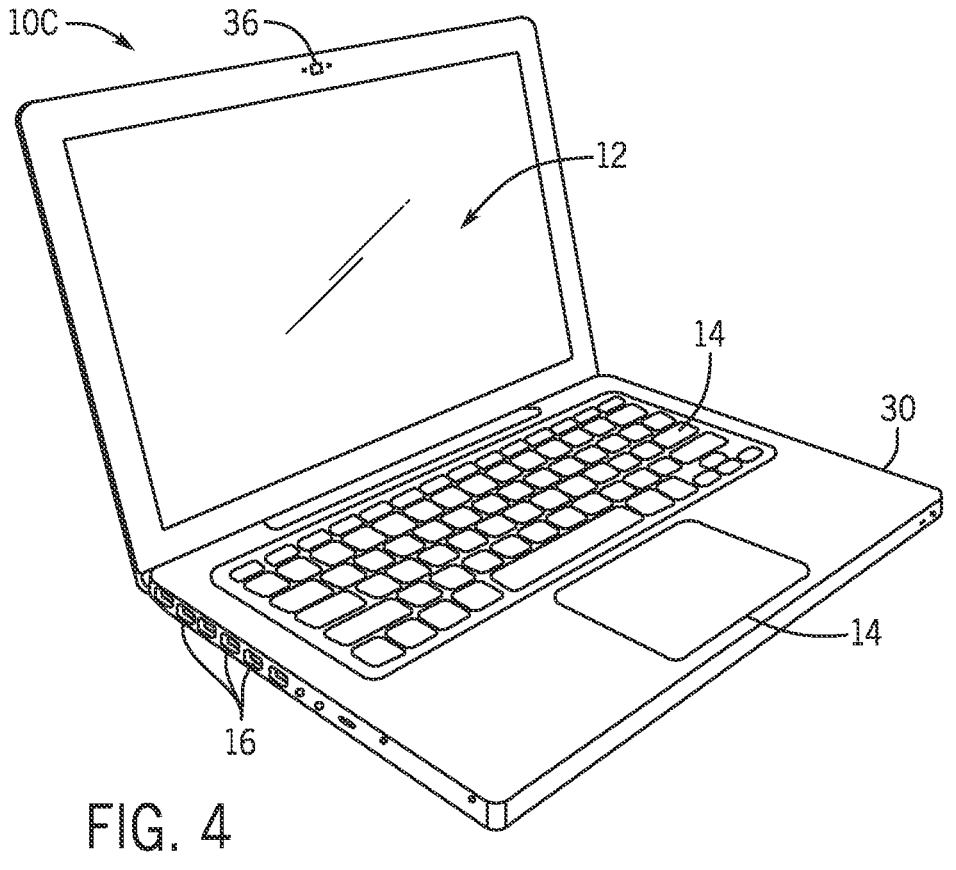
FIG. 4 is a front view of a notebook computer representing an example of the electronic device of FIG. 1, in accordance with an embodiment.
Figure 5:
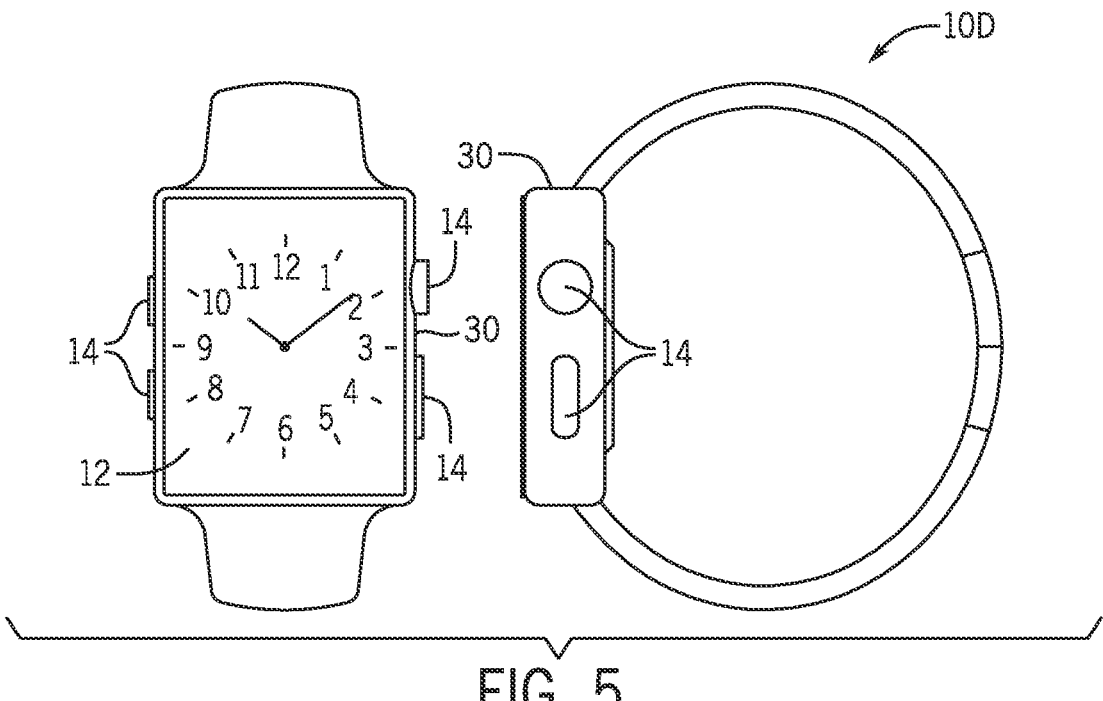
FIG. 5 are front and side views of a watch representing an example of the electronic device of FIG. 1, in accordance with an embodiment.

Another example of a suitable electronic device 10, specifically, a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MAC-BOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3. Additionally, the electronic device may include one or more cameras 36, such as for capturing images.

Referring back to FIG. 1, circuitry of the electronic device 10, such as those illustrated in FIG. 1, may be fabricated on one or more substrates and may employ different power source 26 voltage levels. The PMU 28 may control and/or monitor the delivery of electrical power from the power source 26, which may be done via on one or more voltage regulator circuits that generate regulated voltage levels to be delivered to the various circuitries of the electronic device 10. For example, the PMU 28 may adjust the electrical power delivered to one or more domains, such as an analog domain, a digital domain, or the like. The PMU 28 may adjust the voltage levels based on operational modes instructed by the processor core complex 18 and/or based on expected or desired energy consumption levels of one or more different components or systems of the electronic device 10. Such voltage regulator circuits may employ passive circuit elements (e.g., inductors, capacitors) and/or active circuit elements (e.g., transistors, diodes). Different types of voltage regulator circuits may be employed based on power usage of load circuits, available circuit area, and the like.

Figures 6, 7:
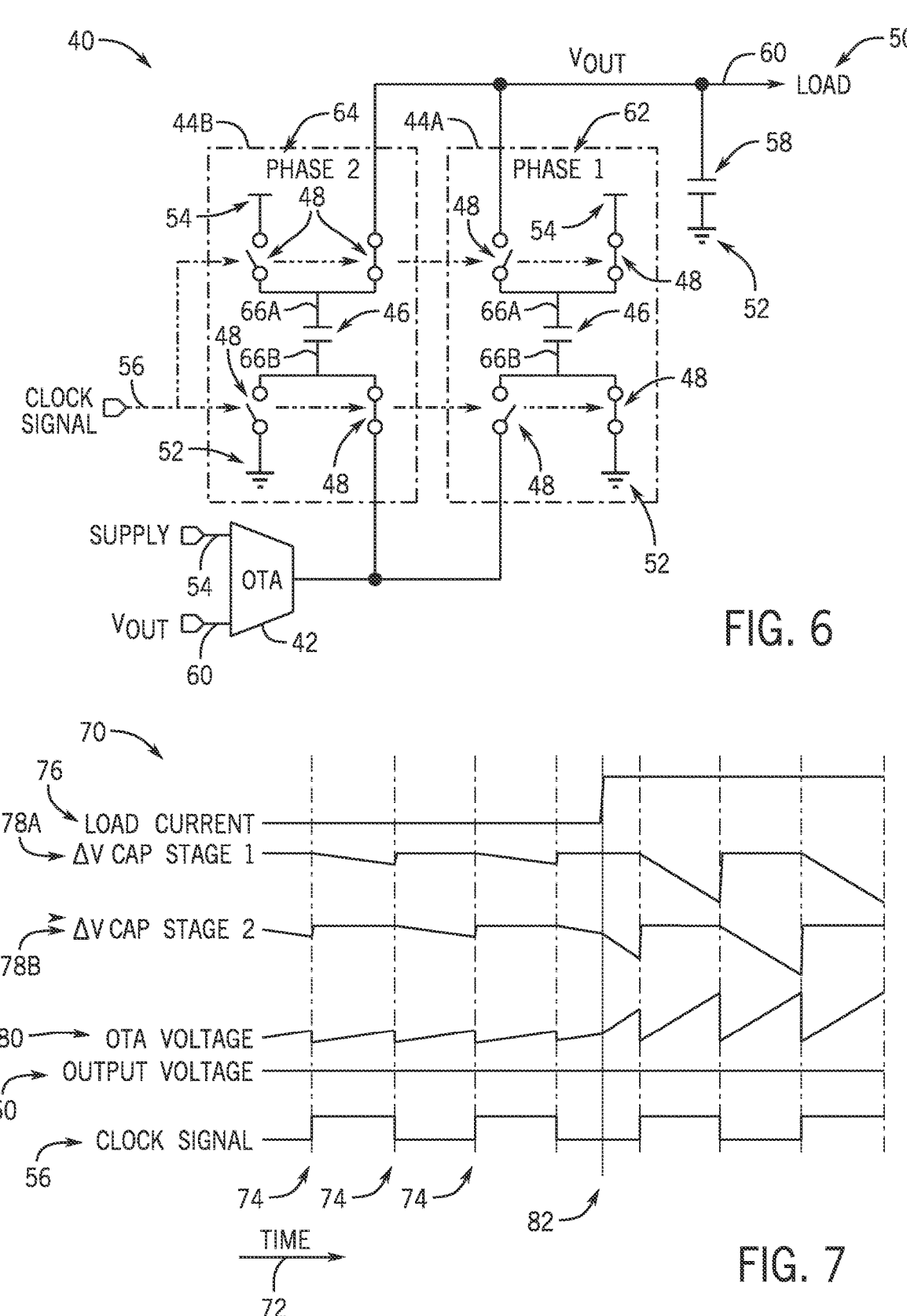
FIG. 6 is a schematic diagram of a reduced-ripple charge pump of the PMU of FIG. 1, in accordance with an embodiment.
FIG. 7 is a timing diagram of power characteristics of the reduced-ripple charge pump of FIG. 6, in accordance with an embodiment.

With the foregoing in mind, in some embodiments, a voltage regulator circuit of a PMU 28 may be or include a reduced-ripple charge pump 40 (e.g., charge pump circuitry), such as in the example schematic diagram of FIG. 6. In some embodiments, the reduced-ripple charge pump 40 may include a current source, such as an operational transconductance amplifier (OTA) 42 and two or more stages 44 (e.g., a first stage 44A and a second stage 44B, cumulatively 44). Each stage 44 may include one or more fly capacitors 46 and a set of switches 48 (e.g., transistors) that operatively connect and disconnect the fly capacitors 46 to a load 50 and the OTA 42 or to a ground reference 52 and a supply voltage 54. Furthermore, in some embodiments, the connections of the fly capacitors 46 may alternate according to a clock signal 56. Additionally, in some embodiments, an output capacitor 58 may provide smoothing/stability to the output voltage 60 (VOUT). However, by reducing or eliminating ripple production through the techniques discussed herein the traditional reliance on an output capacitor 58 to reduce ripple is broken, such that the output capacitor 58 may be reduced in size depending on implementation and/or load 50.

The stages 44 of the reduced-ripple charge pump 40 may alternate between a first phase 62 (e.g., charging phase) and a second phase 64 (e.g., discharging phase) to charge and discharge, respectively, the fly capacitors 46 of opposite stages 44. For example, when a stage 44 (e.g., first stage 44A) is in the first phase 62, a first lead 66A of the fly capacitor 46 may be electrically coupled to the supply voltage 54 and a second lead of the fly capacitor 46 may be coupled to the ground reference 52. Moreover, when a stage 44 (e.g., second stage 44B) is in the second phase 64, the first lead 66A may be electrically coupled to the load 50 (or otherwise an output node of the reduced-ripple charge pump 40) and the second lead 66B may be coupled to the OTA 42. While the first stage 44A is in the first phase 62, the second stage 44B may be in the second phase 64 and vice versa. As should be appreciated, while discussed herein as utilizing an OTA 42, the reduced-ripple charge pump 40 may utilize any suitable amplifier or other current source for supplying current over a range of voltages. Furthermore, while the OTA is depicted as utilizing the supply voltage 54 and the output voltage 60 as inputs, as should be appreciated, the voltages provided to the OTA 42 may be different. For example, the reference voltage supplied to the OTA 42 may or may not be the same as the supply voltage 54 used for charging the fly capacitors 46.

By charging a fly capacitor 46 and coupling the charged fly capacitor 46 between the load 50 and the OTA 42, the voltage differential of the charged fly capacitor 46 may be added to the voltage output of the OTA 42 to provide the output voltage 60 with a boosted voltage above that of the supply voltage 54. To help illustrate, FIG. 7 is a timing diagram 70 of the power characteristics of the reduced-ripple charge pump 40 over time 72. For example, the clock signal 56 may have change points 74 to switch the stages 44 between the different phases (e.g., first phase 62 and second phase 64), while the output voltage stays constant regardless of phase or the draw of the load current 76. The voltage differentials 78 (e.g., first stage voltage differential 78A and second stage voltage differential 78B, cumulatively 78) of the fly capacitors 46 alternate (e.g., cycle) between charging and discharging at the change points 74 (e.g., according to the clock signal 56).

When a stage 44 is in the second phase 64, the voltage differential 78 is added to the OTA voltage output 80 to achieve the output voltage 60. Current may be supplied from the OTA 42 to the fly capacitor 46 to match the current draw of the load 50. Depending on the load current 76, the fly capacitor 46 may discharge slower or faster. For example, after a load increase 82, the voltage differential 78 for the fly capacitor 46 in the second phase 64 may decrease more rapidly. To maintain the constant output voltage 60 as the fly capacitor 46 is discharged (e.g., reducing its stored voltage differential 78), the OTA 42 may increase the OTA voltage output 80 such that the sum of the OTA voltage output 80 and the voltage differential 78 of the fly capacitor 46 in the second phase 64 is maintained at the desired output voltage 60. By utilizing controlled releases of the charge stored on the fly capacitors 46 in the second phase 64, ripples in the output voltage 60 may be avoided that would otherwise be present due, at least in part, to the immediate discharges in traditional charge pumps.

In some embodiments, the clock signal 56 may be controlled such that when the OTA 42 reaches its maximum voltage output (e.g., for the given supply voltage 54 or other reference voltage) or within a buffer of the maximum voltage output of the OTA 42, a change point 74 occurs, alternating the phases of the stages 44. As should be appreciated, the buffer may be based on the maximum voltage output (e.g., the supply voltage) of the OTA 42, a timing of the clock signal 56, the load current 76 of the load 50, the output voltage 60, or a combination thereof. Additionally, as the output voltage 60 is a sum of the OTA voltage output 80 and the voltage differential 78, the increase in voltage, relative to the supply voltage 54, provided by a reduced-ripple charge pump 40 with two stages 44 may be set between x1 and x2 the supply voltage 54. However, as should be appreciated, additional stages 44 may be implemented (e.g., in series) to increase the voltage multiplier output of the reduced-ripple charge pump 40.

As discussed above, the reduced-ripple charge pump 40 may be utilized to generate voltages above the supply voltage 54. In some embodiments, it may be desired to generate negative voltages. As such, in a similar manner as the reduced-ripple charge pump 40, a reduced-ripple negative charge pump 90 (e.g., charge pump circuitry) may be employed in two or more stages 44, as in the example schematic diagram of FIG. 8. However, in the example implementation of the reduced-ripple negative charge pump 90, the electrical connections of the OTA 42 and the load 50 are swapped, relative to the stages 44. For example, to generate negative output voltages 60, the OTA 42 may "push" charge in the opposite direction (e.g., relative to the leads 66 of the fly capacitor 46) of the voltage differential 78 of a charged fly capacitor 46 to force a negative voltage on the other side of the fly capacitor 46. Furthermore, in some embodiments, the OTA 42 may be a push-pull OTA or other amplifier with current sinking capability.

As with the reduced-ripple charge pump 40, during the first phase 62 the first lead 66A may be coupled to a supply voltage 54 and the second lead 66B may be coupled to a ground reference 52. However, in the second phase 64 of the reduced-ripple negative charge pump 90, the first lead 66A may be coupled to the OTA 42 (instead of the load 50) and the second lead 66B may be coupled to the load 50 (instead of the OTA 42). By increasing the positive charge on the first lead 66A of the fly capacitor 46 with the OTA 42, a corresponding negative charge develops on the second lead 66B coupled to the load 50 providing a negative output voltage 60.

Figures 8, 9:
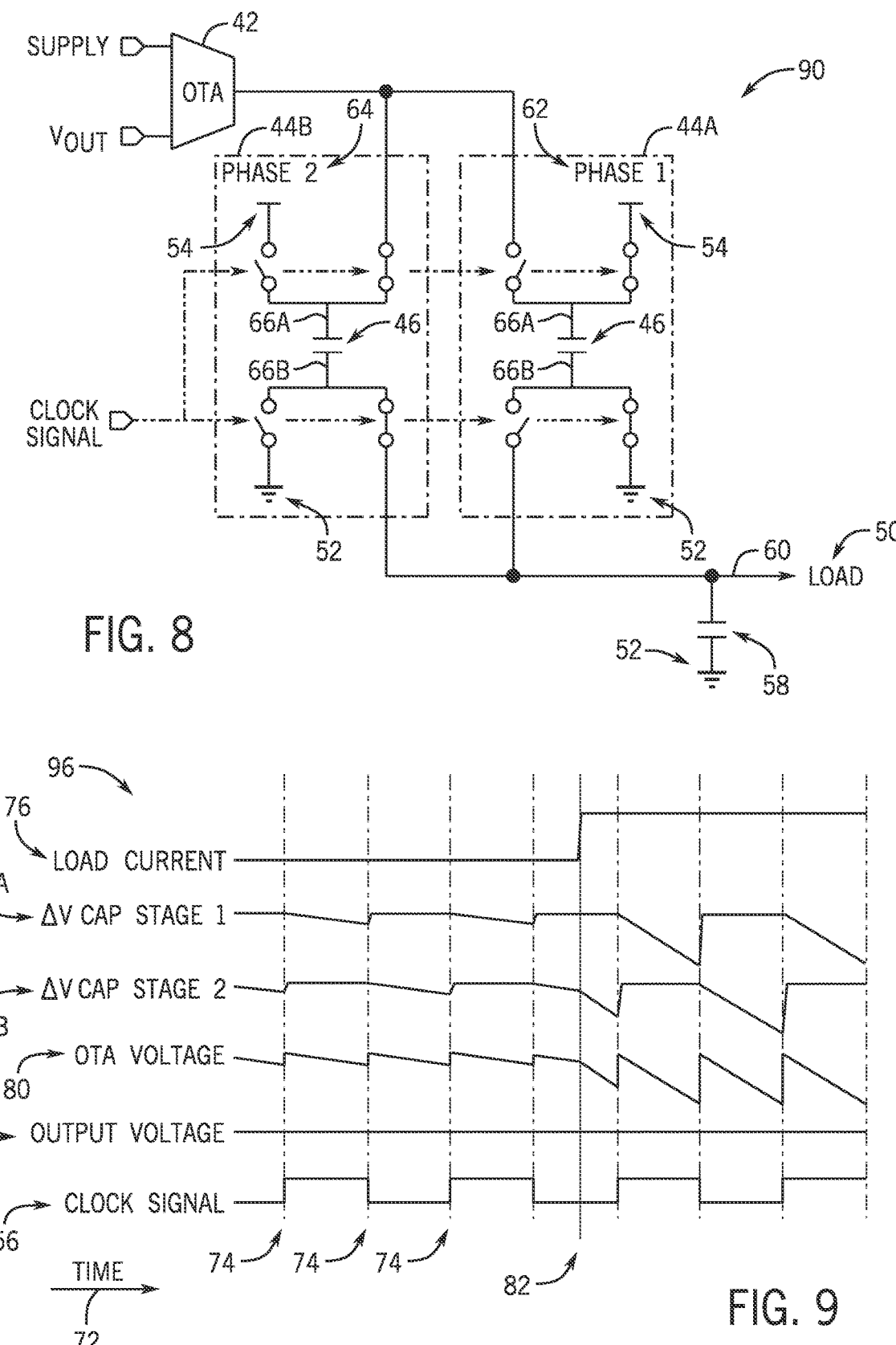
FIG. 8 is a schematic diagram of a reduced-ripple negative charge pump of the PMU of FIG. 1, in accordance with an embodiment.
FIG. 9 is a timing diagram of power characteristics of the reduced-ripple negative charge pump of FIG. 8, in accordance with an embodiment.

To help illustrate, FIG. 9 is a timing diagram 96 of power characteristics of the reduced-ripple negative charge pump 90 over time 72. As should be appreciated, the fly capacitors 46 of the first stage 44A (e.g., voltage differential 78A) and the second stage 44B (e.g., voltage differential 78B) are charged and discharged in the same manner as the reduced-ripple charge pump 40 providing positive voltages. However, the OTA voltage output 80 starts at a positive voltage at the beginning of the second phase 64 and decreases as the fly capacitor 46 discharges. Indeed, as the voltage differential 78 decreases, less positive charge on the first lead 66A is needed to maintain the negative charge on the second lead 66B of the fly capacitor 46 and, therefore, maintain the constant negative voltage of the output voltage 60.

As the voltage differential 78 is effectively directed in the opposite direction of the OTA 42, the output voltage 60 may be the sum of the negative of the voltage differential 78 and the OTA voltage output 80. For example, if the supply voltage is 10 volts and the OTA 42 supplies 5 volts during the second phase 64, the output voltage may be −5 volts. Furthermore, while the OTA 42 may provide a positive voltage that decreases with the voltage differential 78, the OTA 42 may sink the current equivalent to the load current 76. When the OTA 42 reaches the ground reference 52 or within a buffer thereof, the clock signal may alternate the phases of the stages 44 so that the output voltage 60 is maintained at the desired negative voltage.

As discussed above, the OTA 42 provides (or sinks) current to match the load current 76 to the fly capacitor 46 in the second phase 64 to "push" or "pull" current to/from the load 50 from the fly capacitor 46. Furthermore, the OTA 42 either increases the OTA voltage output 80 (e.g., in the case of a positive output voltage 60) or decreases the OTA voltage output 80 (e.g., in the case of a negative output voltage 60) according to the discharge of the fly capacitor 46. Moreover, the discharge time of the fly capacitor may vary based on the size of the fly capacitor and the load current 76. In other words, at lower current draws, the fly capacitors 46 may discharge slower in the second phase 64 than at higher current draws. As such, in some embodiments, the frequency of the clock signal 56 may be adjusted to maintain the output voltage 60 based on the load current 76 of the load 50. For example, at a lower current draw, there may be additional time before the combined output of the decreasing voltage differential 78 of the fly capacitor 46 and the increasing (e.g., or decreasing in the case of the reduced-ripple negative charge pump 90) OTA voltage output 80 can no longer sustain the desired output voltage 60. As such, the length of time between phase switches may be decreased at lower current draws.

Figure 10:
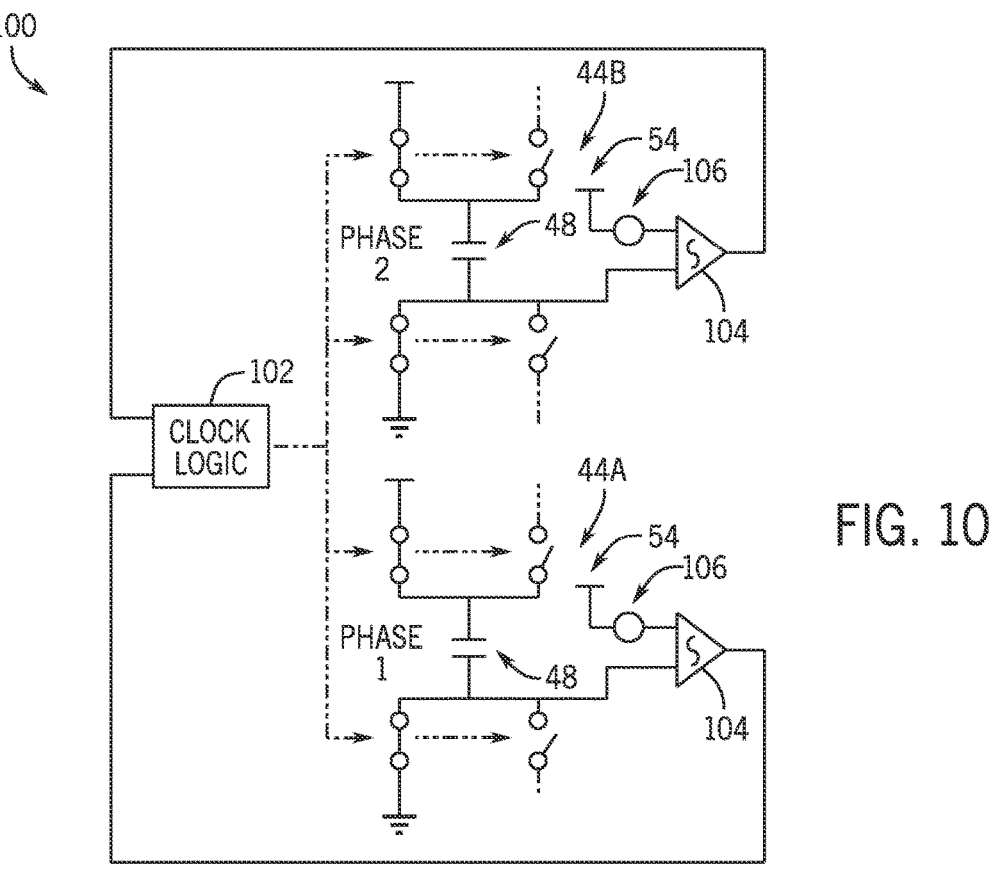
FIG. 10 is a schematic diagram of clock circuitry coupled to a portion of the reduced-ripple charge pump of FIG. 6 or the reduced-ripple negative charge pump of FIG. 8, in accordance with an embodiment.

In some embodiments, the clock signal 56 may have a preset frequency or be controllable, such as via clock circuitry 100 (e.g., clock controller), as in the schematic diagram of FIG. 10. The clock circuitry 100 may include clock logic 102 to estimate, measure, or otherwise assume (e.g., based on an operating mode of the electronic device 10, the load 50) a current draw of the load 50 and adjust the clock frequency based thereon. Furthermore, in some embodiments, the clock signal 56 may be regulated (e.g., controlled, generated) by one or more processors (e.g., processing circuitry), such as the processor core complex 18 or other processor(s). For example, the clock circuitry 100 may include or be coupled to one or more processors (e.g., processing circuitry) to control the switches 48.

Additionally or alternatively, the clock circuitry 100 may include one or more comparators 104 to monitor the voltage differentials 78 of the fly capacitors 46. As such, switching between phases may be triggered based on how quickly the fly capacitors 46 discharge. As should be appreciated, the comparator(s) 104 may utilize any suitable comparator threshold depending on implementation. For example, a comparator 104 may compare the voltage differential 78 of a fly capacitor 46 to the supply voltage 54 (or other reference voltage) displaced by a voltage offset 106. As should be appreciated, the comparator threshold, which may be obtained by the comparator 104 by the voltage offset 106 and/or other reference voltage, may be set based on the supply voltage 54, the output voltage 60 and/or characteristics of the OTA 42. Moreover, in some embodiments, the clock circuitry 100 may be integral with the reduced-ripple charge pump 40 (or reduced-ripple negative charge pump 90) such that the reduced-ripple charge pump 40 is considered to self-clock based on the current draw (e.g., load current 76) of the load 50. Furthermore, in some embodiments, the switches 48 may be considered part of the clock circuitry 100, part of the stages 44, or both.

Figure 11:
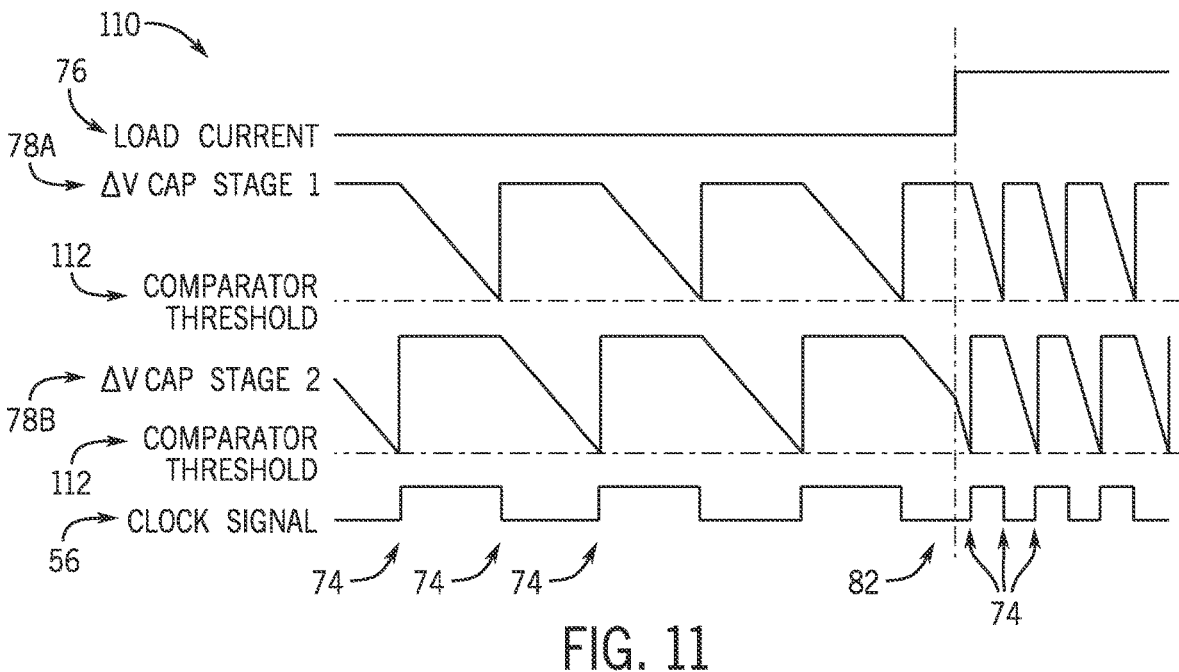
FIG. 11 is a timing diagram of power characteristics of the clock circuitry and portion of the reduced-ripple charge pump of FIG. 10, in accordance with an embodiment.

To help illustrate, FIG. 11 is a timing diagram 110 of power characteristics of the clock circuitry 100 in conjunction with the voltage differentials of the flying capacitors 46. As discussed above, the voltage differentials 78 alternate discharge periods according to the current phase. When utilizing a self-clocking mode, the clock circuitry 100 may compare the voltage differentials 78 of the fly capacitors 46 to a comparator threshold 112 and trigger a change point 74 in the clock signal 56 when the voltage differential 78 reaches the comparator threshold 112. As discussed above, the rate of discharge of the fly capacitors 46 may increase in response to an increase in the load current 76. When utilizing the self-clocking mode, the clock signal 56 may likewise change frequency in response to the load current 76. In the illustrated example, in response to the load increase 82 the clock signal frequency increases.

FIG. 12 is a flowchart of an example process for operating the reduced-ripple charge pump 40 or the reduced-ripple negative charge pump 90. In general, a first fly capacitor 46 may be coupled between a supply voltage 54 and a ground reference 52, charging the first fly capacitor 46 with a voltage differential (process block 122). Additionally, the first fly capacitor 46 may be disconnected from the supply voltage 54 and the ground reference 52 and electrically coupled between an amplifier (e.g., OTA 42) and a load 50, beginning a discharge period of the first fly capacitor 46 (process block 124). While the first fly capacitor 46 is coupled between the amplifier and the load 50, a second fly capacitor 46 may be coupled between the supply voltage 54 and the ground reference 52, charging the second fly capacitor (process block 126). Furthermore, while the first fly capacitor 46 is coupled between the amplifier and the load 50, a voltage may be provided to the first fly capacitor 46 via the amplifier such that a sum of the voltage differential 78 of the first fly capacitor and the output of the amplifier (e.g., OTA voltage output 80) is equal to a desired voltage (e.g., output voltage 60) at the load 50 throughout the discharge period (process block 128). The charging and discharging periods of the first and second fly capacitors 46 may be alternated (process block 130).

As such, an electronic device 10 may include a reduced-ripple charge pump 40 (or reduced-ripple negative charge pump 90), such as in a PMU 28, for providing an increased (e.g., relative to the supply voltage) output voltage (or negative voltage) without or with reduced voltage deviations (e.g., ripples, ringing), while having a reduced footprint (e.g., smaller or eliminated output capacitor 58), and/or increased power efficiency, as compared to a conventional charge pump circuit.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Moreover, techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electrical device comprising:
an electrical load configured to draw a current; and
a charge pump configured to provide the current to the electrical load at an output voltage, the charge pump comprising:
an amplifier configured to supply an output current to match the current;
a first fly capacitor;
a second fly capacitor; and
a first set of switches configured to electrically couple the first fly capacitor between a supply voltage and a ground reference based on a clock signal having a first voltage level and to electrically couple the first fly capacitor between the amplifier and the electrical load based on the clock signal having a second voltage level different from the first voltage level; and
a second set of switches configured to electrically couple the second fly capacitor between the supply voltage and the ground reference based on the clock signal having the second voltage level different from the first voltage level and to electrically couple the second fly capacitor between the amplifier and the electrical load based on the clock signal having the first voltage level.

2. The electrical device of claim 1, wherein the amplifier comprises an operational transconductance amplifier (OTA).

3. The electrical device of claim 1, wherein the output voltage of an output node is greater than the supply voltage, wherein the output node is directly coupled to an input of the amplifier.

4. The electrical device of claim 1, wherein the first fly capacitor is configured to be charged with a voltage differential when electrically coupled between the supply voltage and the ground reference.

5. The electrical device of claim 4, wherein the amplifier is configured to electrically couple to the first fly capacitor such that output voltage is based on the output current and the voltage differential.

6. The electrical device of claim 1, comprising clock circuitry, a first comparator coupled to the first fly capacitor, and a second comparator coupled to the second fly capacitor, wherein the clock circuitry is configured to alternate a frequency of the clock signal based on a comparison between a voltage of the first fly capacitor and a threshold voltage.

7. The electrical device of claim 1, comprising clock circuitry configured to increase a frequency of the clock signal based on an increase in the current.

8. The electrical device of claim 1, wherein the output voltage is a negative voltage relative to the ground reference.

9. Charge pump circuitry comprising:
an amplifier;
an electrical output configured to output an output voltage, wherein the output voltage is a negative voltage relative to a ground reference;
a first fly capacitor configured to cycle between a charging phase and a discharging phase, wherein the first fly capacitor is configured to be electrically coupled between a supply voltage and the ground reference during the charging phase and electrically coupled between the amplifier and the electrical output during the discharging phase; and a second fly capacitor configured to cycle between the charging phase and the discharging phase, wherein the second fly capacitor is configured to be electrically coupled between the supply voltage and the ground reference during the charging phase and electrically coupled between the amplifier and the electrical output during the discharging phase, wherein the first fly capacitor is configured to be operated in the charging phase while the second fly capacitor is operated in the discharging phase, and wherein the second fly capacitor is configured to be operated in the charging phase while the first fly capacitor is operated in the discharging phase, wherein the amplifier is configured to supply a current to match current usage on the electrical output.

10. The charge pump circuitry of claim 9, wherein the amplifier is configured to, while the first fly capacitor is in the discharging phase, charge the first fly capacitor based on a voltage differential of the first fly capacitor.

11. The charge pump circuitry of claim 10, wherein the output voltage comprises a sum of a changing voltage and the voltage differential of the first fly capacitor in the discharging phase.

12. The charge pump circuitry of claim 9, wherein the first fly capacitor comprises a first lead and a second lead, wherein the first lead is configured to electrically couple to the supply voltage during the charging phase and the second lead is configured to electrically couple to the ground reference during the charging phase.

13. The charge pump circuitry of claim 12, wherein the first lead is configured to electrically couple to the amplifier during the discharging phase and the second lead is configured to electrically couple to the electrical output during the discharging phase.

14. The charge pump circuitry of claim 9, comprising a plurality of switches configured to:

based on a clock signal having a first voltage level, electrically couple the first fly capacitor between the supply voltage and the ground reference and electrically couple the second fly capacitor between the amplifier and the electrical output; and based on the clock signal having a second voltage level different from the first voltage level, electrically couple the second fly capacitor between the supply voltage and the ground reference and electrically couple the first fly capacitor between the amplifier and the electrical output.

15. The charge pump circuitry of claim 14, comprising clock circuitry configured to generate the clock signal based on a current draw on the electrical output.

16. The charge pump circuitry of claim 14, wherein the plurality of switches comprises a plurality of transistors, and wherein the amplifier comprises an operational transconductance amplifier (OTA).

17. The charge pump circuitry of claim 9, wherein the amplifier comprises an operational transconductance amplifier (OTA) configured as a current source that supplies the current to match the current usage on the electrical output.

18. A non-transitory machine-readable medium comprising instructions, wherein, when executed by one or more processors, the instructions cause the one or more processors to perform operations or to control clock circuitry to perform the operations, wherein the operations comprise:

providing a clock signal having a first voltage level to a plurality of switches of charge pump circuitry, wherein the clock signal having the first voltage level is configured to actuate the plurality of switches to electrically couple a first fly capacitor of the charge pump circuitry between a supply voltage and a ground reference and electrically couple a second fly capacitor of the charge pump circuitry between an amplifier of the charge pump circuitry and an electrical output of the charge pump circuitry, and wherein the amplifier is configured to supply a current to match current usage on the electrical output;

providing the clock signal having a second voltage level different from the first voltage level to the plurality of switches, wherein the clock signal having the second voltage level different from the first voltage level is configured to actuate the plurality of switches to electrically couple the second fly capacitor between the supply voltage and the ground reference and electrically couple the first fly capacitor between the amplifier and the electrical output; and alternating a frequency of the clock signal based on a load of the electrical output.

19. The non-transitory machine-readable medium of claim 18, wherein the operations comprise receiving an indication of the load, wherein the indication comprises a comparison between a reference voltage and a voltage differential of the first fly capacitor or the second fly capacitor.

20. The non-transitory machine-readable medium of claim 18, wherein an output voltage of the electrical output comprises a negative voltage relative to the ground reference.

* * * * *